United States Patent
Tamane et al.

(10) Patent No.: US 10,894,526 B2
(45) Date of Patent: Jan. 19, 2021

(54) KEY UNIT

(71) Applicants: Toyota Jidosha Kabushiki Kaisha, Toyota (JP); Nomura Research Institute, Ltd., Tokyo (JP); Kabushiki Kaisha Tokai Rika Denki Seisakusho, Aichi (JP)

(72) Inventors: Yasuyuki Tamane, Miyoshi (JP); Tsukasa Takahashi, Tokyo (JP); Masaki Oshima, Aichi-ken (JP)

(73) Assignees: Toyota Jidosha Kabushiki Kaisha, Toyota (JP); Nomura Research Institute, Ltd., Tokyo (JP); Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 16/124,659

(22) Filed: Sep. 7, 2018

(65) Prior Publication Data

US 2019/0118769 A1    Apr. 25, 2019

(30) Foreign Application Priority Data

Oct. 23, 2017  (JP) ................................ 2017-204741

(51) Int. Cl.
*B60R 25/24* (2013.01)
*H05K 5/00* (2006.01)
(Continued)

(52) U.S. Cl.
CPC .......... *B60R 25/24* (2013.01); *G07C 9/00309* (2013.01); *G07C 9/00944* (2013.01);
(Continued)

(58) Field of Classification Search
CPC .......... B60R 25/24; G07C 2009/00769; G07C 2009/00984; G07C 9/00309;
(Continued)

(56) References Cited

U.S. PATENT DOCUMENTS 6,178,311 B1 *   1/2001  Pance ................... H01P 1/2039
                                              333/12
8,921,721 B2 * 12/2014  Senzaki ................. H01H 13/85
                                              200/5 A
(Continued)

FOREIGN PATENT DOCUMENTS

CN     103262128 A    8/2013
EP       2466554 A2    6/2012
(Continued)

*Primary Examiner* — Yong Hang Jiang
(74) *Attorney, Agent, or Firm* — Dinsmore & Shohl LLP

(57) ABSTRACT

A key unit that locks and unlocks a target by transmitting a signal to a locking and unlocking device, includes: a substrate on which a power supply circuit and a reception circuit that receives a request signal transmitted in a first frequency band from the locking and unlocking device via a reception antenna are mounted; and a housing configured to accommodate the substrate. Among parts associated with the power supply circuit, a part having the highest height from a substrate surface is mounted on a first surface of the substrate. The reception antenna is mounted on a second surface. When the substrate is accommodated in the housing, a distance from a substrate surface of the second surface to an inner surface of the housing is shorter than a distance from the substrate surface of the first surface to the inner surface of the housing.

11 Claims, 8 Drawing Sheets

(51) Int. Cl.
*H05K 1/18* (2006.01)
*G07C 9/00* (2020.01)
*H04W 12/06* (2009.01)
*H01Q 1/32* (2006.01)
*H01R 12/72* (2011.01)
*H01R 12/70* (2011.01)

(52) U.S. Cl.
CPC .......... H05K 1/181 (2013.01); H05K 5/0069 (2013.01); *G07C 2009/00769* (2013.01); *G07C 2009/00984* (2013.01); *H01Q 1/3241* (2013.01); *H01R 12/7088* (2013.01); *H01R 12/722* (2013.01); *H04W 12/06* (2013.01); *H05K 2201/10015* (2013.01); *H05K 2201/10189* (2013.01); *H05K 2201/10545* (2013.01)

(58) Field of Classification Search
CPC .............. G07C 9/00944; H01Q 1/3241; H01R 12/7088; H01R 12/722; H04W 12/06; H05K 1/181; H05K 2201/10015; H05K 2201/10189; H05K 2201/10545; H05K 5/0069
See application file for complete search history.

(56) References Cited

U.S. PATENT DOCUMENTS

| | | | |
|---|---|---|---|
| 2002/0107545 A1* | 8/2002 | Rissmann | A61N 1/375 607/5 |
| 2003/0117295 A1* | 6/2003 | Okada | B60R 25/2072 340/12.23 |
| 2009/0108990 A1 | 4/2009 | Suzuki et al. | |
| 2009/0160607 A1 | 6/2009 | Edwards et al. | |
| 2010/0207725 A1* | 8/2010 | Hattori | G07C 9/00944 340/5.72 |
| 2013/0341414 A1* | 12/2013 | Ziller | G07C 9/00944 235/492 |
| 2014/0176301 A1 | 6/2014 | Fernandez Banares et al. | |

FOREIGN PATENT DOCUMENTS

| JP | 2006118122 A | 5/2006 |
|---|---|---|
| JP | 2006121278 A | 5/2006 |

* cited by examiner

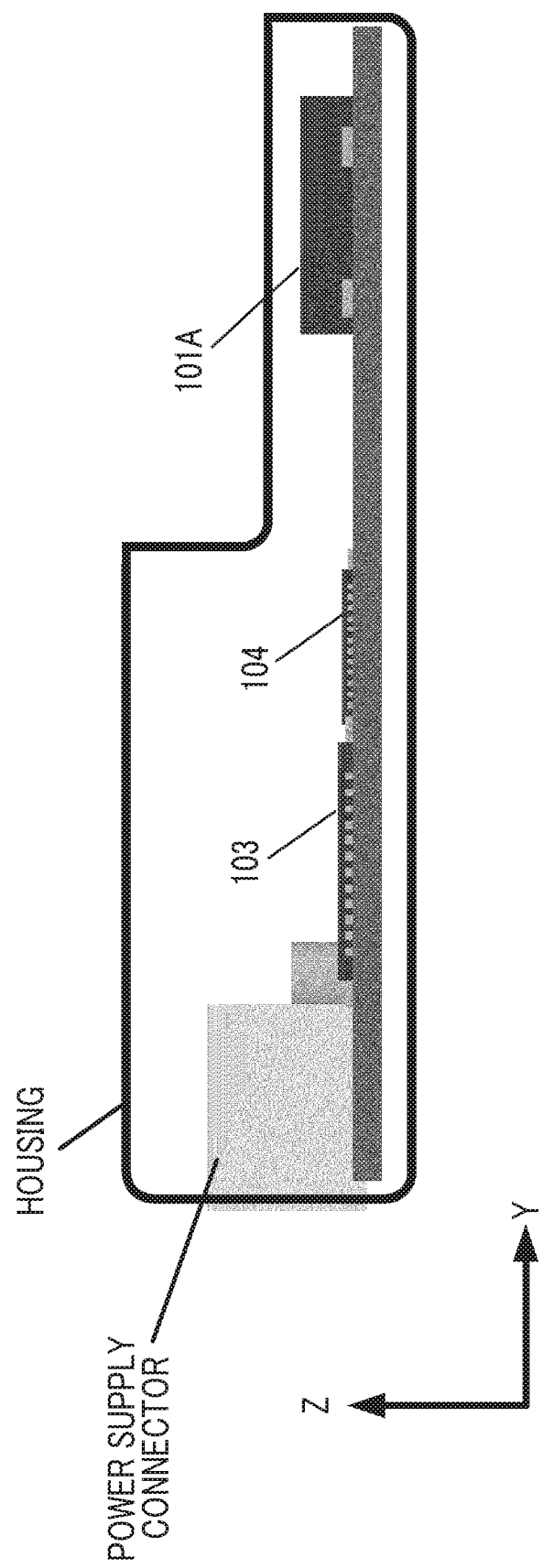

KEY UNIT

CROSS-REFERENCE TO RELATED APPLICATIONS

This application claims priority to Japanese Patent Application No. 2017-204741 filed on Oct. 23, 2017, which is incorporated herein by reference in its entirety including the specification, drawings and abstract.

BACKGROUND

1. Technical Field

The disclosure relates to a key unit which performs locking and unlocking.

2. Description of Related Art

A key management system is known, in which authentication information for unlocking a vehicle is acquired by a portable terminal from a server device via a network and the portable terminal can be used as an electronic key (Japanese Unexamined Patent Application Publication No. 2006-118122 (JP 2006-118122 A)). In the system, the vehicle has means for reading an integrated circuit (IC) tag, and unlocking is performed using the portable terminal and the IC tag in which key information is written. Japanese Unexamined Patent Application Publication No. 2006-121278 (JP 2006-121278 A) discloses a communication system which performs remote locking and unlocking of a vehicle.

SUMMARY

Vehicles on sale have smart key systems. The smart key system gives an identifier (ID) unique to a portable device (electronic key) that performs wireless communication with a vehicle, and enables door unlocking and engine starting in a case where the ID obtained by the communication matches an ID registered in the vehicle in advance. A system that enables locking and unlocking of the vehicle by a portable terminal without remodeling the vehicle by using the smart key system is being studied.

For example, a key unit having a role of the electronic key is installed in the vehicle and a validity/invalidity of the electronic key is switched based on the result of authentication performed via the wireless communication. In doing so as described above, it becomes possible to lock and unlock the vehicle using the portable terminal such as a smartphone.

The smart key system uses radio waves in a long wave band for polling from a vehicle side and uses radio waves in an ultra-high frequency band for transmitting a response signal to the vehicle side. Therefore, in the key unit using the smart key system, it is needed to mount a circuit (low frequency (LF) circuit) that receives radio waves in a low frequency band and a circuit (radio frequency (RF) circuit) that transmits radio waves in a high frequency band. In addition, a circuit that performs the wireless communication with the portable terminal, and a unit that supplies power to the circuit are also needed. That is, in a case of designing the key unit using the smart key system, it is desirable to appropriately dispose the circuits.

The disclosure provides a key unit in which parts are optimally disposed and which controls locking and unlocking of a target.

A first aspect of the disclosure relates to a key unit that locks and unlocks a target by transmitting a signal to a locking and unlocking device. In a case where the target is a vehicle, the locking and unlocking device is mounted on the vehicle and controls the locking and unlocking of a door. In this case, the key unit is installed inside the vehicle and transmits the signal to the locking and unlocking device from inside the vehicle. The signal may be a key signal used in a smart key system.

The key unit according to the first aspect of the disclosure includes: a substrate on which a power supply circuit and a reception circuit that receives a request signal transmitted in a first frequency band from the locking and unlocking device via a reception antenna are mounted; and a housing configured to accommodate the substrate. Among parts associated with the power supply circuit, a part having the highest height from a substrate surface is mounted on a first surface of the substrate. The reception antenna is mounted on a second surface which is a surface on an opposite side to the first surface. In a case where the substrate is accommodated in the housing, a distance from a substrate surface of the second surface to an inner surface of the housing is shorter than a distance from the substrate surface of the first surface to the inner surface of the housing.

The parts associated with the power supply circuit include, for example, a plug connector and an electrolytic capacitor. In order to mount the parts, a certain degree of the height is needed, and thus, inevitably, the height of the housing increases. On the other hand, in a case where a new key is registered in the locking and unlocking device, bringing the antenna that receives radio waves in the first frequency band close to a vehicle side antenna may be needed. Here, in a case where the parts associated with the power supply circuit and the reception antenna are mounted on the same surface, a distance between the reception antenna and the housing becomes long, and thus, a distance between the reception antenna and the vehicle side antenna becomes inevitably long. That is, sensitivity of communication decreases.

With the key unit according to the first aspect of the disclosure, among the parts associated with the power supply circuit, the part having the highest height and the reception antenna are respectively disposed on the different surfaces of the substrate. According to the configuration, it is possible to reduce the height of the part on the surface on which the reception antenna is mounted, and thus, it is possible for the reception antenna to be brought closer to the vehicle side antenna. That is, it is possible to obtain good sensitivity of communication at the time of registration.

In the key unit according to the first aspect of the disclosure, the substrate may be a multilayer substrate having a ground layer in the middle.

By providing the ground layer in the middle of the substrate, it becomes possible to suppress propagation of noise between a front surface and a back surface of the substrate. That is, it becomes possible to restrain the noise generated in the power supply circuit or the like from reaching the reception antenna, and to maintain a communication state better.

In the key unit according to the first aspect of the disclosure, the locking and unlocking device may be configured to lock and unlock a vehicle by transmitting the request signal in the first frequency band, and receiving a response signal in a second frequency band which is a frequency band higher than the first frequency band, the locking and unlocking device being mounted on the vehicle.

In the key unit according to the first aspect of the disclosure, the substrate may further include a transmission circuit that transmits the response signal in the second frequency band to the locking and unlocking device.

The first aspect of the disclosure can be suitably applied to an embodiment in which the vehicle is locked and unlocked using the existing smart key system.

In the key unit according to the first aspect of the disclosure, the power supply circuit may be mounted on a first region of the first surface including a first side of the substrate, and the reception antenna may be mounted on a second region of the second surface including a second side opposite to the first side.

As described above, in a case where a region on the substrate is divided into the first region and the second region, the power supply circuit may be disposed on the first region and the reception antenna may be disposed on the second region. According to such a configuration, it is possible to maintain a distance between the power supply circuit and the reception antenna, and to suppress adverse effects due to the noise.

In the key unit according to the first aspect of the disclosure, on the substrate, a communication circuit that performs short-range wireless communication with a portable terminal may be further mounted in the first region, and the substrate may further include a controller configured to authenticate the portable terminal based on information acquired from the portable terminal.

Since the reception antenna is easily affected by noise, it is useful to dispose the reception antenna away from the other communication units. By mounting the communication circuit in the first region, it is possible to maintain a distance from the reception antenna, and to reduce the effects of noise.

In the key unit according to the first aspect of the disclosure, the first frequency band may be a long wave band.

The first aspect of the disclosure can be suitably applied to a system that transmits the request (polling) signal by the radio waves in the long wave band (30 kHz to 300 kHz).

In the key unit according to the first aspect of the disclosure, in the parts associated with the power supply circuit, a plug connector and an electrolytic capacitor may be included.

A second aspect of the disclosure relates to a key unit that locks and unlocks a target by transmitting a signal to a locking and unlocking device. The key unit includes: a substrate on which a reception circuit that receives a request signal transmitted in a first frequency band from the locking and unlocking device via a reception antenna is mounted; and a housing configured to accommodate the substrate. In a case where the substrate is accommodated in the housing, the reception antenna is mounted on one surface that is one of a front surface of the substrate and a back surface of the substrate, the one surface being on a side closer to an inner surface of the housing.

A third aspect of the disclosure relates to a key unit that locks and unlocks a target by transmitting a signal to a locking and unlocking device. The key unit includes: a substrate on which a power supply circuit and a reception circuit that receives a request signal transmitted in a first frequency band from the locking and unlocking device via a reception antenna are mounted; and a housing configured to accommodate the substrate. Among parts associated with the power supply circuit, a part having a highest height from a substrate surface is mounted on a first surface of the substrate. The reception antenna is mounted on a second surface which is a surface on an opposite side to the first surface. In a case where the substrate is accommodated in the housing, a distance from an opposite surface of the reception antenna from a substrate surface side to an inner surface of the housing, the reception antenna being mounted on the second surface is shorter than a distance from an opposite surface of the part having the highest height from a substrate surface side to the inner surface of the housing.

The aspect of the disclosure can be specified as a key unit including at least some of the structure. The embodiment of the disclosure can be specified as a locking and unlocking system including the key unit. Processing and the structure can be freely combined and implemented without technical inconsistency.

According to the aspect of the disclosure, it is possible to dispose the parts optimally in the key unit that controls the locking and unlocking of the target.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a sectional view of a substrate according to a modification example observed in the X axial direction.

DETAILED DESCRIPTION OF EMBODIMENTS

System Outline

Figure 1:
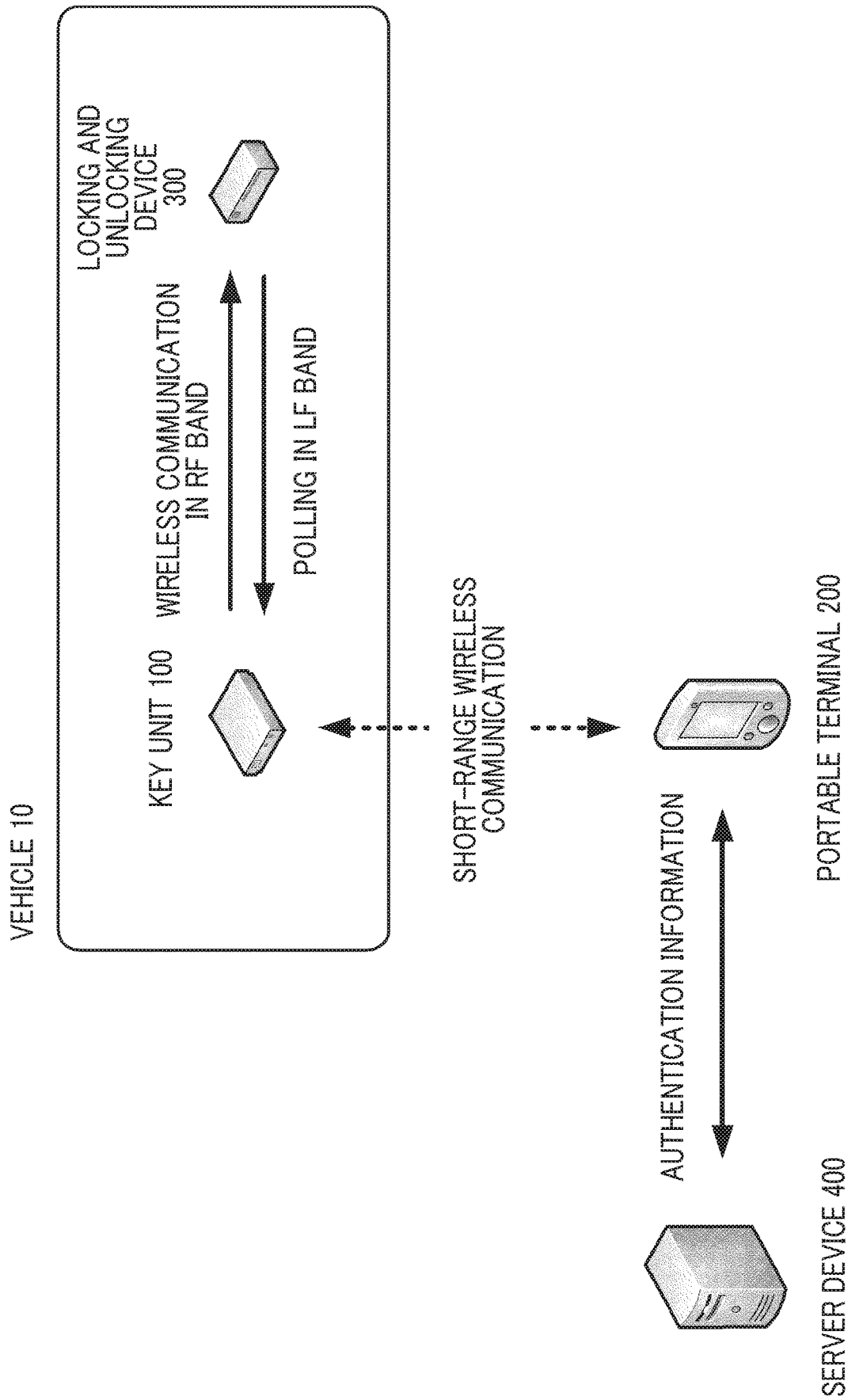
FIG. 1 is a system outline diagram of a locking and unlocking system according to an embodiment.

An outline of a locking and unlocking system according to the embodiment will be described with reference to FIG. 1. The locking and unlocking system according to the embodiment is configured to include a key unit 100 and a locking and unlocking device 300 mounted on a vehicle 10, a portable terminal 200, and a server device 400. In the locking and unlocking system according to the embodiment, the key unit 100 has the same wireless interface as an electronic key (portable device) of a smart key, and it is possible to lock and unlock the vehicle without using a physical key by communicating with the existing locking and unlocking device 300. The key unit 100 performs short-range wireless communication with the portable terminal 200 and determines whether OT not the key unit 100 plays a role of an electronic key of the vehicle 10 based on the result of authenticating the portable terminal 200. That is, a user of the system can lock and unlock the vehicle by manipulating the portable terminal 200 from the outside of the vehicle 10.

System Configuration

Figure 2:
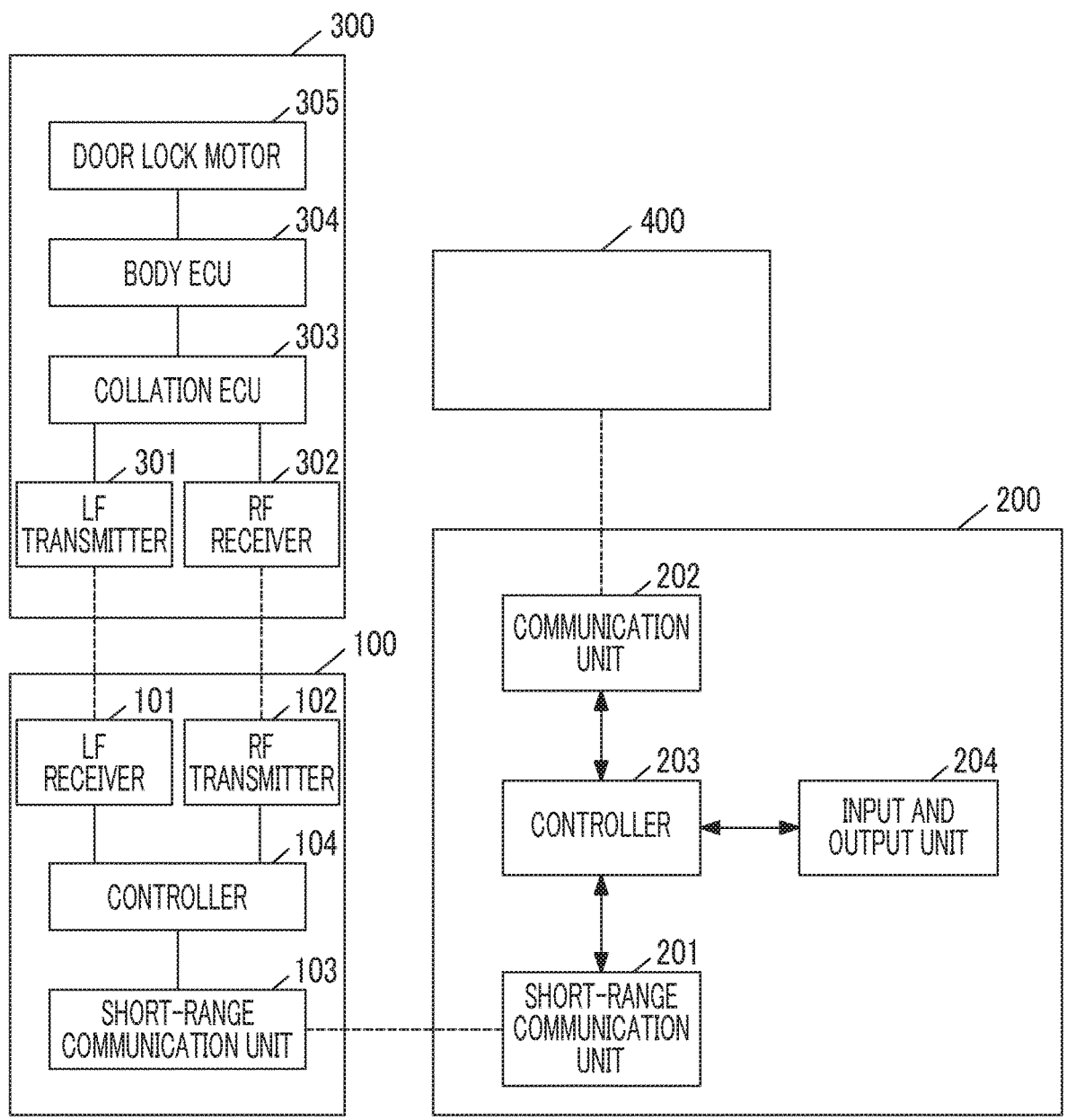
FIG. 2 is a block diagram schematically showing an example of components of the locking and unlocking system.

Components of the system will be described in detail. FIG. 2 is a block diagram schematically showing an example of the configuration of the key unit 100, the portable terminal 200, the locking and unlocking device 300, and the server device 400 shown in FIG. 1. Among the components of the system, the key unit 100 and the locking and unlocking device 300 are mounted on the vehicle 10 which is a target of locking and unlocking (to be locked and to be unlocked).

The locking and unlocking device 300 is a device locking and unlocking a door of the vehicle, and is an existing device constituting a part of a smart key system. Specifically, the door of the vehicle 10 is locked and unlocked according to a locking signal and an unlocking signal transmitted from the electronic key possessed by the user of the vehicle (hereinafter referred to as a portable device) via the radio waves in a high frequency (radio frequency, hereinafter referred to as RF) band. A function of transmitting the radio waves in a low frequency (hereinafter referred to as LF) band for checking the portable device is included.

In the embodiment, the key unit 100 transmits and receives the radio waves in the RF band and the LF band instead of the portable device possessed by the user so as to control the locking and unlocking of the door of the vehicle. Hereinafter, unless otherwise noted, a description will be made with a communication destination of the locking and unlocking device 300 being limited to the key unit 100.

The locking and unlocking device 300 is configured to include an LF transmitter 301, an RF receiver 302, a collation ECU 303, a body ECU 304, and a door lock motor 305. The locking and unlocking device 300 operates by power supplied from an auxiliary battery (not shown) mounted on the vehicle 10.

The LF transmitter 301 transmits the radio waves in the low frequency band (first frequency band in the aspects of the disclosure. For example, 100 KHz to 300 KHz) for checking (polling) the key unit 100. For example, the LF transmitter 301 is built in the vicinity of a center console or a steering wheel in a vehicle cabin.

The RF receiver 302 receives the radio waves in the high frequency band (second frequency band in the aspects of the disclosure. For example, 100 MHz to 1 GHz) transmitted from the key unit 100. The RF receiver 302 can be built in any place in the vehicle cabin.

The collation ECU 303 is a computer that performs control to lock and unlock the door of the vehicle 10, based on the signal (locking signal or unlocking signal) transmitted from the key unit 100 via the radio waves in the RF band. The collation ECU 303 is constituted by, for example, a microcomputer. In the following description, the locking signal and the unlocking signal are collectively referred to as the locking and unlocking signals. The term "locking and unlocking signals" represents at least one of the locking signal and the unlocking signal.

Figure 3:
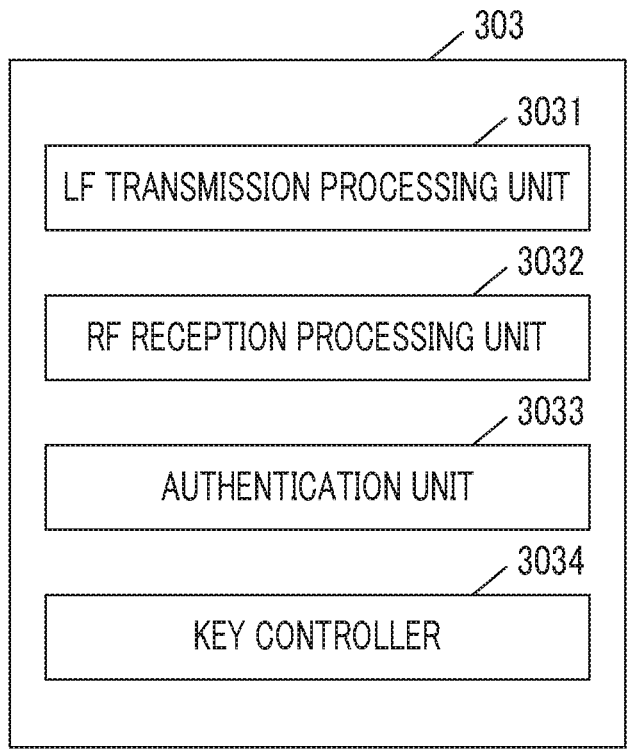
FIG. 3 is an example of functional modules included in a collation electronic control unit (ECU)

FIG. 3 shows functional modules included in a collation ECU 303. Each of the function modules shown in FIG. 3 may be realized by executing a program stored in storage unit such as a read only memory (ROM) by a central processing unit (CPU) (none of which is shown).

An LF transmission processing unit 3031 performs control to transmit a polling signal (request signal in the aspects of the disclosure) to the vehicle cabin as the radio waves in the LF band via the LF transmitter 301. An RF reception processing unit 3032 performs control to receive the locking and unlocking signals (response signal in the aspects of the disclosure) transmitted from the key unit 100 as the radio waves in the RF band via the RF receiver 302. An authentication unit 3033 authenticates whether or not the locking and unlocking signals transmitted from the key unit 100 is transmitted from a legitimate device. Specifically, a determination is made whether or not a key ID included in the locking and unlocking signals matches a key ID stored in advance in the storage unit (not shown) of the collation ECU 303. Specific details will be described later.

A key controller 3034 transmits an unlocking command or a locking command to the body ECU 304, which will be described later, based on the result of the authentication performed by the authentication unit 3033. The signal is transmitted via an in-vehicle network such as a controller area network (CAN).

The body ECU 304 is a computer that controls the body of the vehicle. The body ECU 304 has a function of unlocking and locking the door of the vehicle by controlling a door lock motor 115 described later, based on the received unlocking command or locking command. The body ECU 304 may further have a function of controlling components associated with the vehicle body such as a power window control, a seat adjustment, an anti-theft, a seatbelt control, and a headlight control.

The door lock motor 305 is an actuator that locks and unlocks the door of the vehicle 10 (including a trunk as well as a door for getting on and off and a rear gate). The door lock motor 305 operates based on, a signal transmitted from the body ECU 304.

The key controller 3034 may transmit solely information that the authentication is successful to the body ECU 304 instead of the unlocking command or the locking command. According to such a configuration, it is possible to cause the locking or unlocking operation to be performed with the action by the user (for example, pressing of an unlocking button, and touching of a door knob) as a trigger.

The key unit 100 will be described. The key unit 100 is a device disposed inside the vehicle 10, and has a function of authenticating the portable terminal 200 by performing short-range wireless communication with the portable terminal 200, and a function of transmitting the locking and unlocking signals using the radio waves in the RF band, based on the result of authenticating the portable terminal 200. The key unit 100 is configured to include an LF receiver 101, an RF transmitter 102, a short-range communication unit 103, and a controller 104.

In the embodiment, the key unit 100 is disposed at a predetermined position in the vehicle cabin (for example, in a glove compartment), and operates by the power supplied from the auxiliary battery (not shown) mounted on the vehicle 10.

The LF receiver 101 receives the polling signal transmitted from the locking and unlocking device 300 via the radio waves in the LF band. The LF receiver 101 has au antenna (hereinafter referred to as an LF antenna) that receives the radio waves in the LF band.

The RF transmitter 102 transmits the locking and unlocking signals to the key unit 100 via the radio waves in the RF band.

The short-range communication unit 103 communicates with the portable terminal 200 possessed by the user. The short-range communication unit 103 performs the communication in a short range (to the extent that the communication can be performed inside and outside the vehicle cabin) using a predetermined wireless communication standard.

In the embodiment, the short-range communication unit 103 performs the data communication by Bluetooth (registered trademark) Low Energy standard (hereinafter referred to as BLE). The BLE is a low power communication standard based on Bluetooth, and has a feature that the communication can be started immediately by detecting a partner without requiring pairing between the devices. In the embodiment, the BLE is exemplified, but the other wireless communication standards can also be used. For example, near-field communication (NFC), ultra-wide band (UWB), wireless fidelity (WiFi) (registered trademark) can be used.

The controller 104 is a computer that performs the short-range wireless communication with the portable terminal 200 via the short-range communication unit 103, performs control to authenticate the portable terminal 200, and performs control to transmit the locking and unlocking signals based on the authentication result. The controller 104 is constituted by, for example, a microcomputer.

Figure 4:
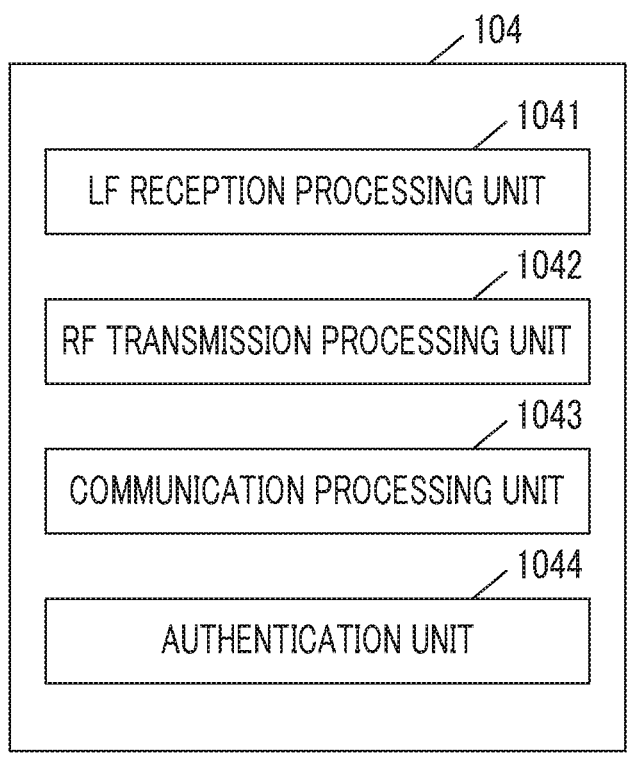
FIG. 4 is an example of functional modules included in a controller.

The functional modules included in the controller 104 are shown in FIG. 4, Each of the function modules shown in FIG. 4 may be, realized by executing the program stored in the storage unit (ROM or the like) by the CPU (none of which are shown).

An LF reception processing unit 1041 performs control to receive the polling signal transmitted from the locking and unlocking device 300 as the radio waves in the LF band via the LF receiver 101. An RF transmission processing unit 1042 performs control to transmit the locking and unlocking signals as the radio waves in the RF band via the RF transmitter 102. The locking and unlocking signals are generated by a communication processing unit 1043 described later, in a case where an authentication unit 1044 described later successfully authenticates the portable terminal 200.

The communication processing unit 1043 processes the communication with the portable terminal 200 via the short-range communication unit 103. Specifically, the communication processing unit 1043 receives a locking request or an unlocking request (hereinafter collectively referred to as locking and unlocking requests) from the portable terminal 200, and generates the locking and unlocking signals according to the received request. The generated locking and unlocking signals are temporarily stored, and are output at a timing when the authentication unit 1044 described later successfully authenticates the portable terminal 200.

The authentication unit 1044 authenticates the portable terminal 200 based on authentication information included in the locking and unlocking requests transmitted from the portable terminal 200. Specifically, the authentication information stored in the storage unit (not shown) is compared with the authentication information transmitted from the portable terminal 200, and in a case where both pieces of the authentication information match, determination is made that the authentication is successful. In a case where both pieces of the authentication information do not match, determination is made that the authentication failed. In a case where the authentication unit 1044 successfully authenticates the portable terminal 200, the locking and unlocking signals generated by the communication processing unit 1043 is output to the RF transmission processing unit 1042, and wirelessly transmitted to the locking and unlocking device 300. An authentication method performed by the authentication unit 1044 may be a method of simply comparing pieces of authentication information to verify the identity or a method using asymmetric encryption. Hereinafter, the authentication information stored in the key unit 100 is referred to as device authentication information, and the authentication information transmitted from the portable terminal 200 is referred to as terminal authentication information, as necessary for description.

In the embodiment, the authentication unit 1044 is set to generate a transmission trigger of the locking and unlocking signals; however, the authentication unit 1044 may control a power supply of the key unit 100 based on the authentication status. For example, in a situation where authentication of the portable terminal 200 is not performed, all the components except the communication processing unit 1043 and the authentication unit 1044 are set to be in a suspend state, and in a case where the authentication is successful, in a predetermined period (for example, until the response from the locking and unlocking device 300 to the transmitted locking and unlocking signals is made), all the components may be in an energized state. As long as the locking and unlocking signals can be transmitted solely in a case where the authentication is successful, the method to realize the authentication is not limited.

The key unit 100 simultaneously transmits the locking and unlocking signals and the ID of the electronic key (hereinafter referred to as key ID) to the locking and unlocking device 300. The key ID may be stored in advance in the key unit 100 in a plaintext state or may be stored in a state encrypted by a cryptogram unique to the portable terminal 200. In the case where the key ID is encrypted and stored, by the authentication information transmitted from the portable terminal 200, the encrypted key ID may be decrypted to obtain the original key ID.

The portable terminal 200 will be described. The portable terminal 200 is a small computer such as a smartphone, a mobile phone, a tablet terminal, a personal information terminal, and a wearable computer (smartwatch or the like). The portable terminal 200 is configured to include a short-range communication unit 201, a communication unit 202, a controller 203, and an input and output unit 204.

The short-range communication unit 201 communicates with the key unit 100 according to the same communication standard as the short-range communication unit 103. The communication unit 202 connects the portable terminal 200 to a network. In the embodiment, it is possible to communicate with the other device (for example, the server device 400) via the network by using a mobile communication service such as Third Generation (3G) and Long Term Evolution (LTE).

The controller 203 is a computer that controls the portable terminal 200. The controller 203 performs, for example, processing of generating the locking and unlocking requests, processing of acquiring the terminal authentication information, and processing of transmitting the locking and unlocking requests and the terminal authentication information to the key unit 100. The controller 203 is constituted by, for example, a microcomputer. The controller 203 may realize the functions such as the processing by executing the program stored in the storage unit (ROM or the like) by the CPU (none of which is shown).

The controller 203 interacts with the user via the input and output unit 204. The input and output unit 204 receives an input manipulation performed by the user and presenting information to the user. Specifically, the input and output unit is constituted by a touch panel, control unit of the touch panel, a liquid crystal display, and control unit of the liquid crystal display. In the embodiment, the touch panel and the liquid crystal display are configured to be a single touch panel display.

The controller 203 displays a manipulation screen on the input and output unit 204, and generates the unlocking request or the locking request based on the manipulation performed by the user. For example, the controller 203 outputs an icon for unlocking, and an icon for locking to the touch panel display, and generates the unlocking request or the locking request based on the manipulation performed by the user. The manipulation performed by the user is not limited to the operation via the touch panel display. For example, the operation may be an operation via a hardware switch.

The controller 203 performs the processing of acquiring the terminal authentication information. In the embodiment, the terminal authentication information is generated in the server device 400 and transmitted to the portable terminal 200 via the communication unit 202. In a case where the portable terminal 200 does not have the terminal authentication information, the locking manipulation and the unlocking manipulation from the manipulation screen are not possible.

The terminal authentication information acquired by the portable terminal 200 may be for an unchanging key or for a one-time key. In either case, the device authentication information corresponding to the terminal authentication information is stored in advance in the key unit 100.

Outline of Locking and Unlocking Device

Before the detailed description of the system, the outline of the operation performed by the existing locking and unlocking device 300 will be described. The locking and unlocking device 300 is a device constituting a normal smart key system, and communicates with the portable device possessed by the user so as to detect that the portable device is in the vicinity of the vehicle or inside the vehicle cabin. As described above, in the embodiment, the key unit 100 plays a role of a portable device.

More specifically, the collation ECU 303 transmits the polling signal to the inside and outside of the vehicle at a predetermined period via the LF transmitter 301, and receives a return signal transmitted by the key unit 100 in response to the polling signal. The key ID unique to the key twit 100 is included in the return signal, and the registered key ID of the key unit 100 is stored in the collation ECU 303. The collation ECU 303 performs the authentication processing of the key unit 100 by using the received key ID and the stored key ID. In a case where the key unit 100 is successfully authenticated, the body ECU 304 is notified that the authentication is successful, and it is possible to cause the vehicle to perform a predetermined operation (for example, door unlocking, cancellation, of the immobilizer) as the above description.

Figure 5:
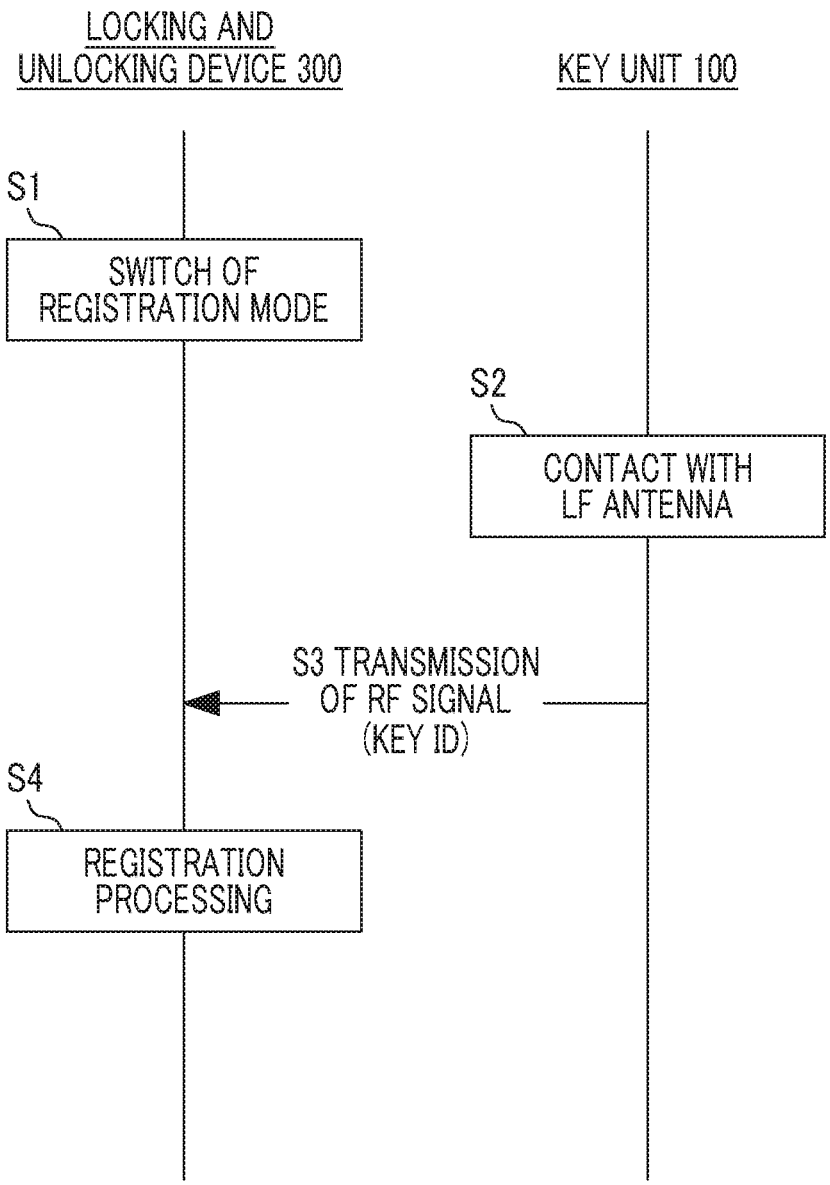
FIG. 5 is a setup flowchart of a key unit.

Here, the work of registering the key ID of the key unit 100 in the locking and unlocking device 300 will be described. The work is performed by a manufacturer or an owner of the vehicle. Here, the flow of the work will be described with reference to FIG. 5.

First, in step S1, the locking and unlocking device 300 switches to a mode for registering a new key ID. At this time, the locking and unlocking device 300 may request communication with the previously registered portable device (that is, portable device having the previously stored key ID). As described above, it is possible to confirm that the person performing the registration work is a legitimate owner of the vehicle.

In step S2, the user brings the LF antenna of the key unit 100 close to or substantially into contact with an antenna coil (not show) (typically built in the vicinity of a push start switch of the vehicle) of the locking and unlocking device 300. As described above, the power is supplied from the antenna coil to the key unit 100 by electromagnetic induction, and the key unit 100 transmits the key ID using the power (step S3). The operation is known for the registration of the key ID on a vehicle side in a smart key system for an automobile (commonly referred to as transponder communication). The transmitted key ID is received by the locking and unlocking device 300 and registered as a valid key ID (step S4). That is, the locking and unlocking device and the key unit are linked.

The communication and the processing performed between the locking and unlocking device 300 and the key unit 100 has been described above. In the locking and unlocking system according to the embodiment, the key unit 100 installed in the vehicle transmits the key ID to the locking and unlocking device 300 instead of the portable device, and thus it is possible to lock and, unlock the vehicle without using the portable device.

Operation of System

Figure 6:
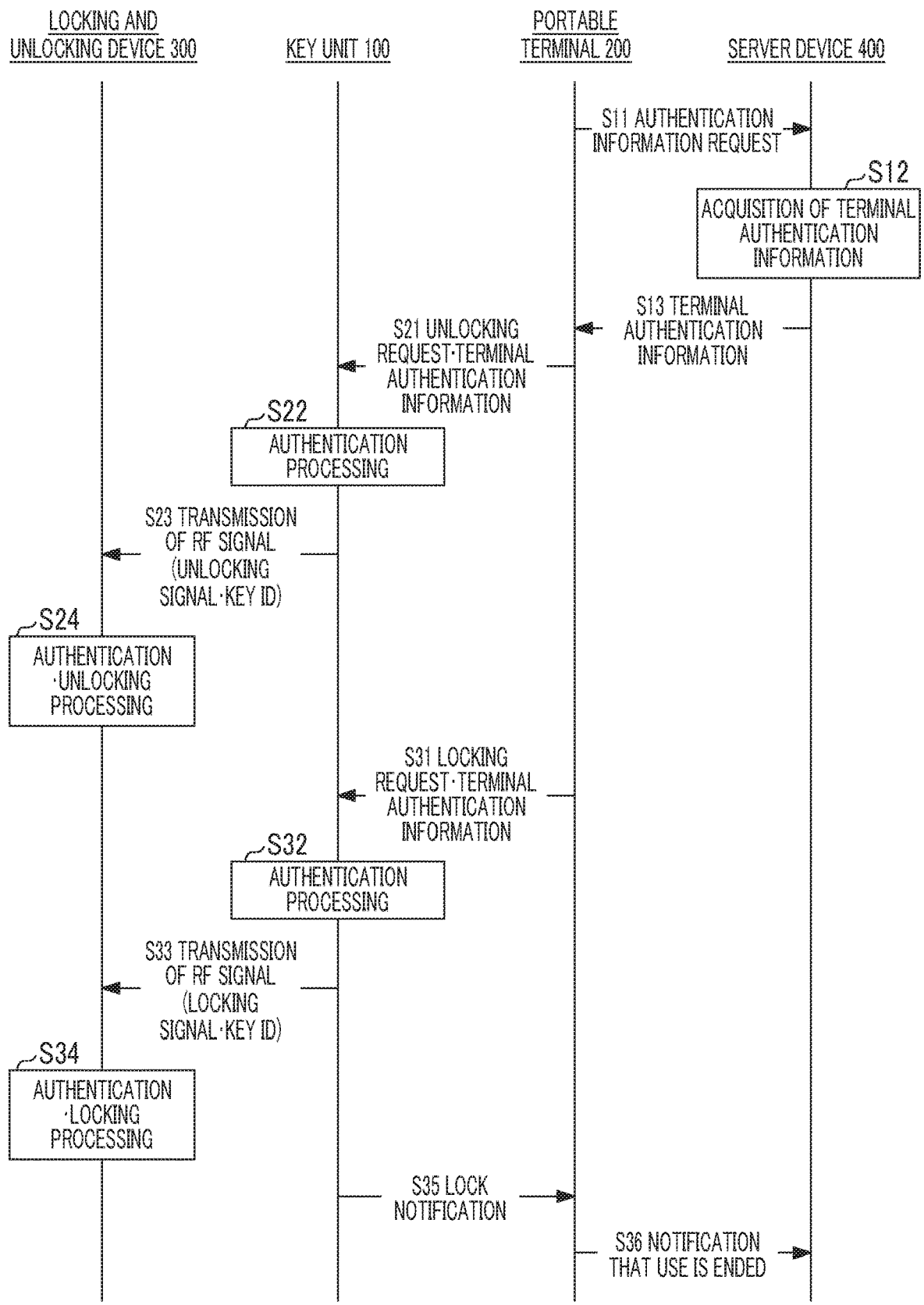
FIG. 6 is a flowchart of data and processing between the components.

The operation of the locking and unlocking system according to the embodiment will be described with reference to FIG. 6. FIG. 6 is a flowchart for describing data transmitted and received between the components and the processing performed by each of the components.

First, in step S11, the portable terminal 200 requests the server device 400 to issue terminal authentication information. The terminal authentication information described here is not information for the locking and unlocking device 300 to authenticate the key unit 100, and is information for the key unit 100 to authenticate the portable terminal 200. When the portable terminal 200 transmits the information identifying the terminal to the server device 400, the server device 400 acquires the terminal authentication information unique to the portable terminal 200 (step S12), and transmits the acquired terminal authentication information to the portable terminal 200 (step S13). As described above, it is possible to perform the manipulation of unlocking the vehicle 10 by the portable terminal 200. Since, the processing in steps S11 to S13 is preparation processing for locking and unlocking, the processing is not particularly limited, and it is useful to perform the processing in advance.

Steps S21 to S24 are processing for unlocking the vehicle 10 using the portable terminal 200. When the user of the portable terminal 200 performs the manipulation to unlock the vehicle 10 via the input and output unit 204, the portable terminal 200 transmits the unlocking request and the terminal authentication information to the server device 400 in step S21. In step S22, the key unit 100 compares the terminal authentication information transmitted from the portable terminal 200 with the device authentication information stored in advance, and performs the authentication processing.

In a case where the authentication succeeds, the key unit 100 transmits the unlocking signal and the key ID to the locking and unlocking device 300 in step S23. Then, in step S24, the locking and unlocking device 300 performs the authentication processing based on the received key ID. As a result, in a case where the authentication succeeds, the door of the vehicle 10 is unlocked. At this time, an answerback or the like may be performed.

Steps S31 to S36 are processing for locking the vehicle 10 using the portable terminal 200. When the user of the portable terminal 200 performs the manipulation of locking the vehicle 10 via the touch panel screen, the portable terminal 200 transmits the locking request and the terminal authentication information to the server device 400 in step S31. Then, in step S32, the key unit 100 compares the terminal authentication information transmitted from the portable terminal 200 with the device authentication information stored in advance, and performs the authentication processing.

In case of where the authentication succeeds, the key unit 100 transmits the locking signal and a key ID to the locking and unlocking device 300 in step S33. Then, in step S34, the locking and unlocking device 300 performs the authentication processing based on the received key ID. As a result, in a case where the authentication succeeds, the door of the vehicle 10 is locked.

After the transmission of the locking signal, the key unit 100 transmits a notification (lock notification) that the locking is completed to the portable terminal 200 (step S35). As described above, a notification that the locking is completed is output to the touch panel screen of the portable terminal 200. In a case where the authentication information is for a one-time key, the one-time key may be invalidated at the timing of step S35. The portable terminal 200 generates a notification that the use of the system is ended, and transmits the notification to the server device 400 (step S36).

Design issues of the key unit 100 will be described. As described above, the key unit 100 operates by receiving power supply from the auxiliary battery of the vehicle. Therefore, a power supply circuit supplying power of a predetermined voltage to the LF receiver 101, the RF transmitter 102, the short-range communication unit 103, and the controller 104 is needed.

The first issue that arises here is a communication defect due to method of disposing parts. In a case of registering the key unit 100 in the locking and unlocking device 300, as described above, it is needed to bring the LF antenna into contact with the locking and unlocking device as in the portable device. However, since relatively tall parts such as a power supply connector, an electrolytic capacitor are gathered and disposed in the power supply circuit of the key unit 100, in a case where a substrate on which the parts are disposed is accommodated in a housing, a distance from the substrate to the housing becomes longer according to a height of the parts. Therefore, in a case where communication is performed kith the substrate surface directed toward the locking and unlocking device 300, as the height of the part becomes longer, a distance between the LF antenna and the locking and unlocking, device 300 becomes longer. As described above, there is a possibility that a distance needed for good communication is exceeded, and the communication defect may occur.

The second problem is a communication defect that occurs when noise generated in the circuit wraps around the LF receiver 101. As described above, the LF receiver 101 receives the radio waves in the long wave band, and therefore is particularly susceptible to the noise. The noise is typically generated from the power supply circuit, and in addition, the noise may be generated from the short-range communication unit 103. When the noise enters, there is a possibility that the polling signal may not be correctly received.

Figure 7A:
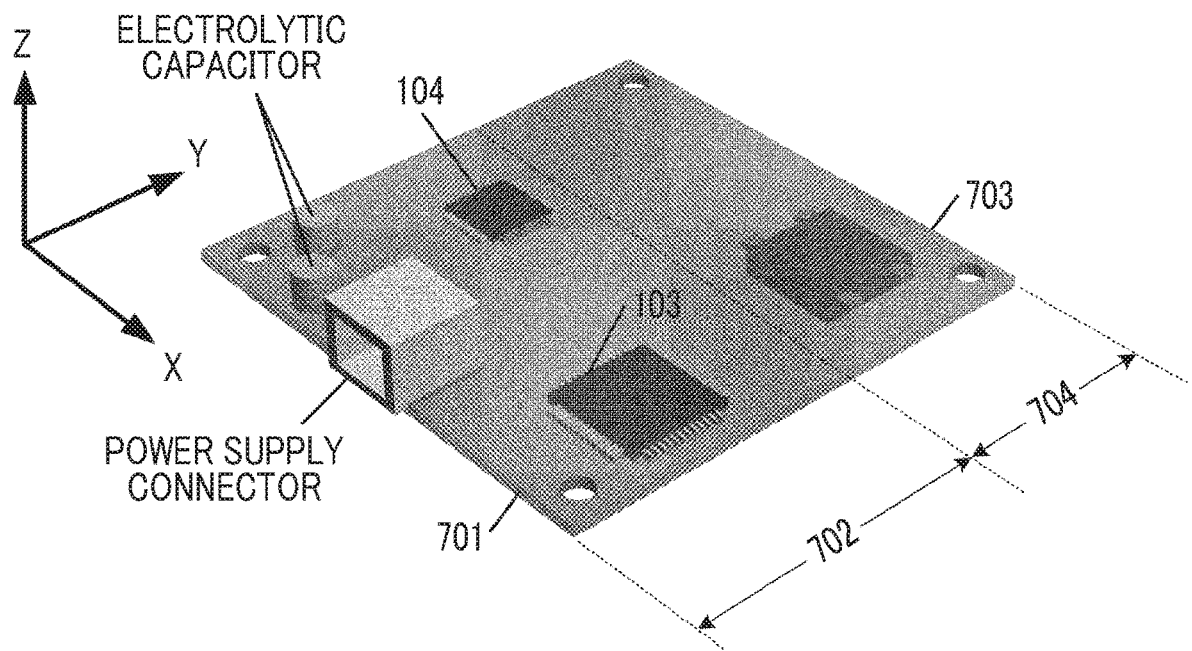
FIG. 7A is a perspective view of a substrate on which each component of the key unit is mounted.
Figure 7B:
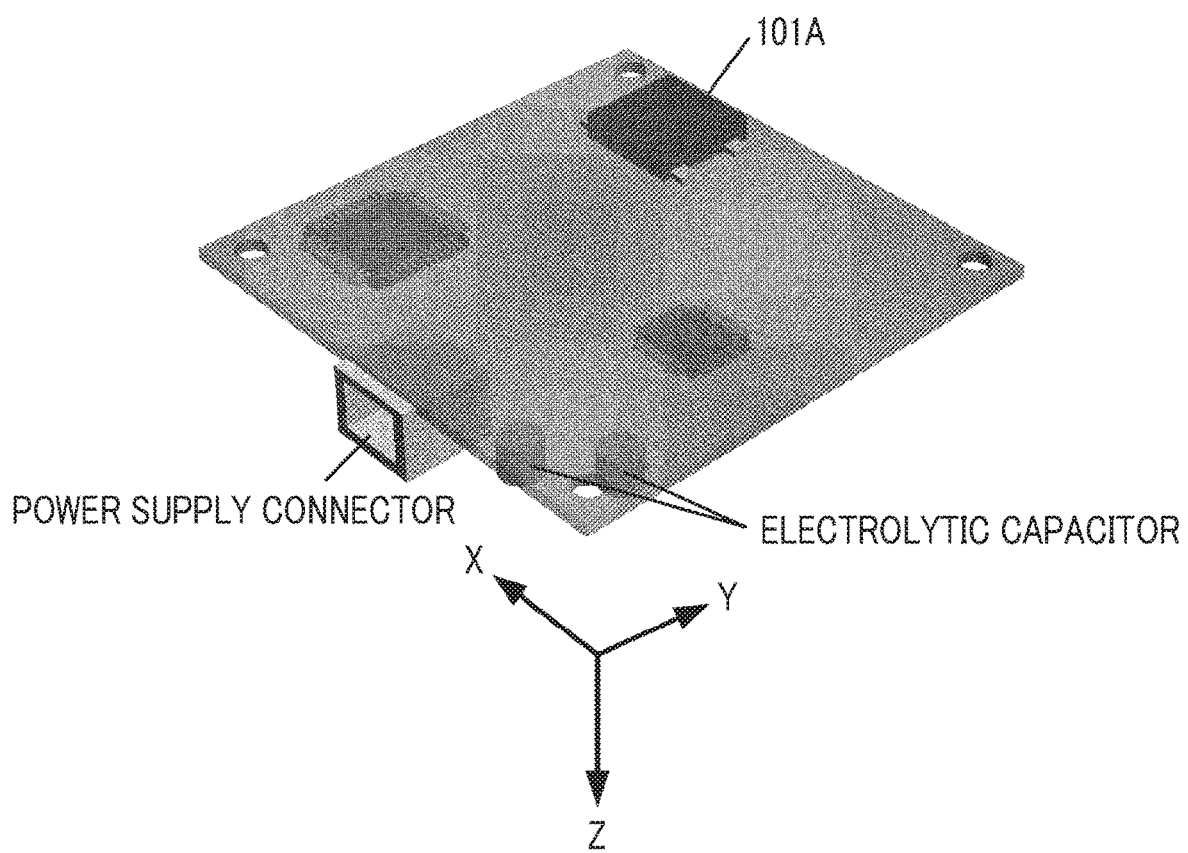
FIG. 7B is a perspective view of a substrate on which each component of the key unit is mounted.

In order to solve the above problem, in the key unit 100 according to the embodiment, on the substrate, the LF antenna that receives the radio waves in the low frequency band is mounted on a surface on the opposite side to a surface on which the parts associated with the power supply circuit are mounted. FIGS. 7A and 7B are perspective views of the substrate on which each component of the key unit 100 is mounted. FIG. 7A represents a front surface of the substrate and FIG. 7B represents a back surface of the substrate. In the embodiment, as shown in the drawings, the parts associated with the power supply circuit, the microcomputer which is the controller 104, and an IC which is the short-range communication unit 103 are mounted on the front surface of the substrate, and the LF receiver 101 (specifically LF antenna. Hereinafter, it is shown as LF antenna 101A) is mounted on the back surface of the substrate.

In FIGS. 7A and 7B, the substrate is shown as being translucent. Therefore, the parts mounted on the back surface can be visually recognized in FIG. 7A, and the parts mounted on the front surface can be visually recognized in FIG. 7B in the same manner.

Figure 8:
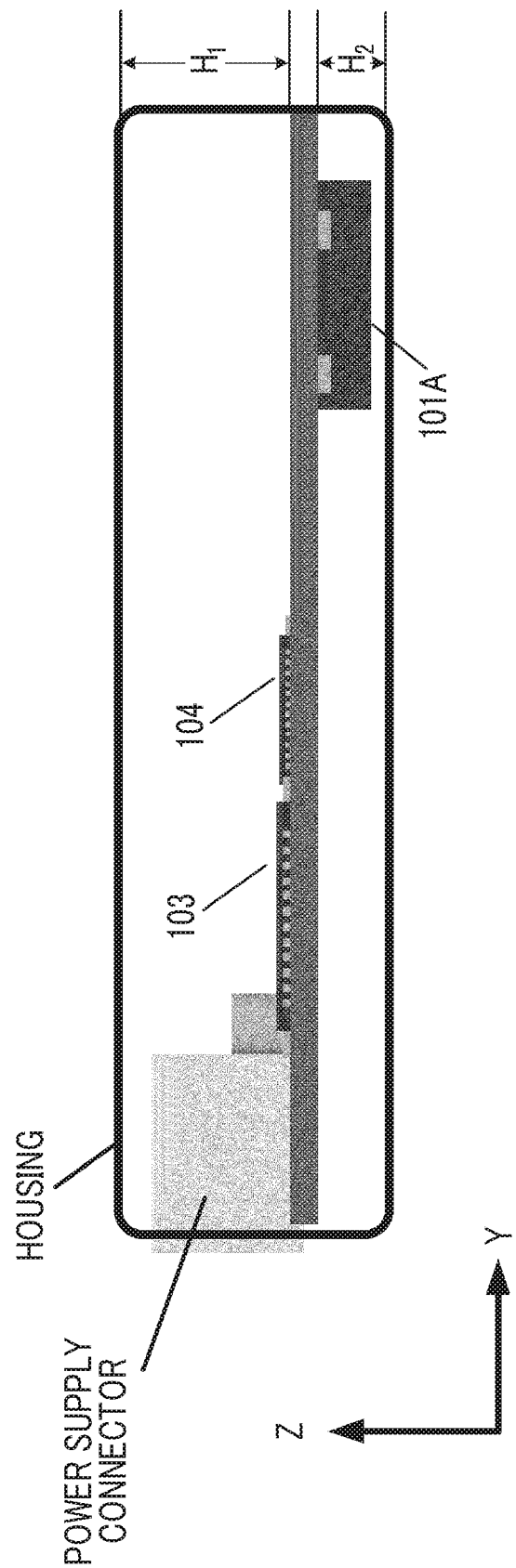
FIG. 8 is a sectional view of a substrate accommodated in a housing observed in an X axial direction.

In the embodiment, by disposing the LF antenna 101A on the back surface of the substrate, it is possible to obtain the effect of reducing the communication defect in the registration operation of the key unit 100. FIG. 8 is the sectional view of the substrate accommodated in the housing observed in a positive X axial direction. The substrate is accommodated in a box-shaped housing as shown. As can be seen from the view, since the parts associated with the power supply circuit are disposed on the front surface of the substrate, it is needed to lengthen a distance H1 from the substrate surface to an inner surface of the housing. On the other hand, since there is no tall part on the back surface of the substrate, by disposing the LF antenna 101A on the back surface of the substrate, it is possible to shorten a distance (H2) from the substrate surface to the inner surface of the housing (H2<H1). That is, since the distance from the LF antenna 101A to the housing surface can be made shorter, the LF antenna 101A can be brought closer to the locking and unlocking device 300 at the time of registration of the key unit 100. As described above, it is possible to improve the communication state in the registration operation. In other word, the distance from the upper portion of the LF antenna 101A to the inner surface of the housing is shorter than the distance from the upper portion of the parts associated with the power supply circuit to the inner surface of the housing.

The substrate in the embodiment is a multilayer substrate including a ground layer in the middle. According to such a configuration, it is possible to reduce the influence of the noise generated from the part mounted on the front surface of the substrate, on the part mounted on the back surface of the substrate. That is, it is possible to reduce the influence of the noise generated in the power supply circuit or the short-range communication unit 103, on the LF receiver 101. The noise can be more reduced by providing the ground layer in the middle of the substrate; however, with a configuration other than the configuration described above as well, the LF antenna 101A can be kept away from a noise source, and a certain degree of the noise reduction effect can be obtained.

In the embodiment, the parts associated with the power supply circuit and the short-range communication unit are disposed in a first region 702 including a first side (reference numeral 701) of the substrate, and the LF antenna 101A is disposed in a second region 704 including a second side (reference numeral 703) opposite to the first side. As described above, the distance between the power supply circuit and the LF antenna 101A can be maintained, and thus the influence of the noise in the communication in the LF band can be reduced.

Modification

The above-described embodiment is merely an example, and the disclosure can be appropriately modified and implemented within a scope not departing from the gist of the disclosure.

For example, in the description of the embodiment, the locking and unlocking device mounted on the vehicle has been exemplified; however, a locking and unlocking device used in combination with the key unit according to the aspects of the disclosure may be mounted in a facility or a building other than the vehicle. The housing shown in FIG. 8 is assumed to be made of plastic; however, any surface of the housing may be made of metal and grounded. An appropriate material can be selected in accordance with a positional relationship between the antenna of the LF transmitter 301 and the LF antenna 101A of the key unit 100 or a directivity of the LF antenna 101A.

Although the portable terminal 200 is exemplified in the description of the embodiment, the portable terminal 200 may not be necessarily a terminal device having a network communication function as long as the portable terminal can hold the authentication information and perform the short-range wireless communication with the key unit 100. For example, a non-contact IC card or the other device may be used.

In the description of the embodiment, the example in which the key unit 100 performs solely the locking and unlocking of the vehicle is shown; however, the key unit 100 may be caused to perform an operation other than the locking and unlocking. For example, the key unit 100 may communicate with a control device that manages an engine so as to enable an engine start of the vehicle. According to such a configuration, a portable device (electronic key) in the related art type possessed by the user can be replaced with the portable terminal.

In the description of the embodiment, the description is made that the key unit 100 receives the polling signal transmitted via the radio waves in the LF band; however, the locking, and unlocking signals may not be necessarily transmitted in response to the polling signal. By transmitting the key ID in response to the polling signal, it is possible to cause the locking and unlocking device 300 to recognize that the valid electronic key is inside the vehicle; however, the locking and unlocking signals may be just transmitted via the radio waves in the RF band.

In the description of the embodiment, the key unit 100 controls the locking and unlocking by using the smart key system mounted on the vehicle; however, as long as it is possible to perform locking and unlocking by the wireless communication, the locking and unlocking device which is the communication destination of the key unit 100 may use one other than the smart key. For example, a keyless entry system may be used.

In the description of the embodiment, the embodiment in which the parts associated with the power supply circuit are mounted on the surface of one side of the substrate and the LF antenna 101A is mounted on the surface of the opposite side to the substrate is exemplified; however, as long as a distance from an upper portion of the LF antenna 101A to the housing can be made shorter than a distance from upper portion of the parts associated with the power supply circuit to the housing, the embodiment is not necessarily limited to the embodiment. For example, as shown in FIG. 9, the height of the housing in a portion where the LF antenna 101A is provided may be lowered after the components are mounted on the front surface of the substrate. According to the configuration as well, it is possible to shorten the distance from the LF antenna 101A to the inner surface of the housing. Instead of processing the housing, the LF antenna 101A itself may be raised by providing a step or the like (Z axial direction) on the substrate side. According to the configuration as well, it is possible to shorten the distance from the upper portion of the LF antenna 101A to the housing.

The embodiment is merely an example for implementing the disclosure. Therefore, the disclosure is not limited thereto, and may be appropriately modified and implemented within a range not departing from the scope of the disclosure described in the claims.

What is claimed is:

1. A key unit that locks and unlocks a target by transmitting a signal to a locking and unlocking device, the key unit comprising:
    a substrate on which a power supply circuit and a reception circuit that receives a request signal transmitted in a first LF frequency band from the locking and unlocking device via an LF reception antenna are mounted, the request signal being a polling signal; and
    a housing configured to accommodate the substrate, the housing having a first inner surface and an opposing second inner surface, wherein:
    among parts associated with the power supply circuit, a part having a highest height from a substrate surface is mounted on a first surface of the substrate, the first surface facing the first inner surface, the part having the highest height has a mounting surface facing the first surface and an opposite outer surface;
    the LF reception antenna is mounted on a second surface of the substrate which is a surface on an opposite side to the first surface, the second surface facing the second inner surface, the LF reception antenna has a mounting surface facing the second surface and an opposite outer surface; and
    in a case where the substrate is accommodated in the housing, a distance from a substrate surface of the second surface to an inner surface of the housing is shorter than a distance from the substrate surface of the first surface to the inner surface of the housing, wherein:
        the power supply circuit is mounted on a first region of the substrate, the first region including a first side of the substrate;
        the LF reception antenna is mounted on a second region of the substrate, the second region including a second side of the substrate opposite to the first side;
        on the substrate, a communication circuit that performs short-range wireless communication with a portable terminal is mounted on the first region;
        the substrate includes a controller configured to authenticate the portable terminal based on information acquired from the portable terminal; and
        a distance between the outer surface of the LF reception antenna and the second inner surface of the housing is less than a distance between the outer surface of the part having the highest height and the first inner surface of the housing.

2. The key unit according to claim 1, wherein the substrate is a multilayer substrate having a ground layer in a middle.

3. The key unit according to claim 1, wherein the locking and unlocking device is configured to lock and unlock a vehicle by transmitting the request signal in the first frequency band, and receiving a response signal in a second frequency band which is a frequency band higher than the first frequency band, the locking and unlocking device being mounted on the vehicle.

4. The key unit according to claim 3, wherein the substrate further includes a transmission circuit that transmits the response signal in the second frequency band to the locking and unlocking device.

5. The key unit according to claim 1, wherein the first frequency band is a long wave band.

6. The key unit according to claim 1, wherein in the parts associated with the power supply circuit, a plug connector and an electrolytic capacitor are included.

7. A key unit that locks and unlocks a target by transmitting a signal to a locking and unlocking device, the key unit comprising:
    a substrate on which a reception circuit that receives a request signal transmitted in a first frequency band from the locking and unlocking device via a reception antenna is mounted, the request signal being a polling signal; and
    a housing configured to accommodate the substrate, the housing having a first inner surface and an opposing second inner surface,
    wherein in a case where the substrate is accommodated in the housing, the reception antenna is mounted on a first surface that is one of a front surface of the substrate and a back surface of the substrate, the first surface being on a side closer to the first inner surface of the housing, the first surface facing the first inner surface, the reception antenna has a mounting surface facing the first surface and an opposite outer surface, wherein:
        a power supply circuit is mounted on a second surface that is the other one of the front surface of the substrate and the back surface of the substrate, the second surface being on a side further away from the first inner surface of the housing compared to the one surface, the second surface facing the second inner surface, the second surface facing the second inner surface, the power supply circuit has a mounting surface facing the second surface and an outer surface;
        the power supply circuit is mounted on a first region of the substrate, the first region including a first side of the substrate;
        the reception antenna is mounted on a second region of the substrate, the second region including a second side of the substrate opposite to the first side;
        on the substrate, a communication circuit that performs short-range wireless communication with a portable terminal is mounted on the first region;
        the substrate includes a controller configured to authenticate the portable terminal based on information acquired from the portable terminal; and
        a distance between the outer surface of the reception antenna and the first inner surface is less than a distance between the outer surface of the power supply circuit and the second inner surface.

8. A key unit that locks and unlocks a target by transmitting a signal to a locking and unlocking device, the key unit comprising:
    a substrate on which a power supply circuit and a reception circuit that receives a request signal transmitted in a first frequency band from the locking and unlocking device via a reception antenna are mounted, the request signal being a polling signal; and
    a housing configured to accommodate the substrate, the housing having a first inner surface and an opposing second inner surface, wherein:
    among parts associated with the power supply circuit, a part having a highest height from a substrate surface is mounted on a first surface of the substrate, the first surface facing the first inner surface, the part having the highest height has a mounting surface facing the first surface and an opposite outer surface;
    the reception antenna is mounted on a second surface of the substrate which is a surface on an opposite side to the first surface, the second surface facing the second inner surface, the reception antenna has a mounting surface facing the second surface and an opposite outer surface; and
    in a case where the substrate is accommodated in the housing, a distance from the outer surface of the reception antenna to the second inner surface of the housing is shorter than a distance from the outer surface of the part having the highest height to the first inner surface of the housing, wherein:
        the power supply circuit is mounted on a first region of the substrate, the first region including a first side of the substrate;
        the reception antenna is mounted on a second region of the substrate, the second region including a second side of the substrate opposite to the first side;
        on the substrate, a communication circuit that performs short-range wireless communication with a portable terminal is mounted on the first region; and
        the substrate includes a controller configured to authenticate the portable terminal based on information acquired from the portable terminal.

9. The key unit according to claim 1, wherein:
the second region is adjacent to the first region; and
the key unit further comprises a boundary portion separating the first region and the second region.

10. The key unit according to claim 7, wherein:
the second region is adjacent to the first region; and
the key unit further comprises a boundary portion separating the first region and the second region.

11. The key unit according to claim 8, wherein:
the second region is adjacent to the first region; and
the key unit further comprises a boundary portion separating the first region and the second region.

* * * * *

UNITED STATES PATENT AND TRADEMARK OFFICE
CERTIFICATE OF CORRECTION

PATENT NO.        : 10,894,526 B2
APPLICATION NO.   : 16/124659
DATED             : January 19, 2021
INVENTOR(S)       : Yasuyuki Tamane, Tsukasa Takahashi and Masaki Oshima It is certified that error appears in the above-identified patent and that said Letters Patent is hereby corrected as shown below:

In the Specification

In Column 4, Line (s) 65, delete "OT" and insert --or--, therefor.

In Column 6, Line (s) 31, after "on", delete ",".

In Column 6, Line (s) 58, delete "au" and insert --an--, therefor.

In Column 9, Line (s) 45, delete "twit" and insert --unit--, therefor.

In Column 10, Line (s) 42, after "Since", delete ",".

In Column 11, Line (s) 48, after "unlocking", delete ",".

In Column 13, Line (s) 39, after "locking", delete ",".

Signed and Sealed this
Fourth Day of May, 2021

Drew Hirshfeld
*Performing the Functions and Duties of the
Under Secretary of Commerce for Intellectual Property and
Director of the United States Patent and Trademark Office*